United States Patent [19]

Krom, Jr.

[11] 4,073,325

[45] Feb. 14, 1978

[54] WOOD-SPLITTING ATTACHMENT

[76] Inventor: Cecil Krom, Jr., P.O. Box 282, Napanoch, N.Y. 12458

[21] Appl. No.: 731,518

[22] Filed: Oct. 12, 1976

[51] Int. Cl.[2] .............................................. A47J 49/02
[52] U.S. Cl. ................................ 144/193 A; 144/3 K
[58] Field of Search .................... 254/104; 144/193 R, 144/193 A, 3 K

[56] References Cited

U.S. PATENT DOCUMENTS 3,780,779 12/1973 Guy ................................ 144/193 A

*Primary Examiner*—Travis S. McGehee
*Assistant Examiner*—W. D. Bray
*Attorney, Agent, or Firm*—John Maier, III

[57] ABSTRACT

A wood-splitting attachment actuated by the hydraulic bucket actuator of a backhoe detachably mounted on the dip stick of a backhoe in place of the bucket of the backhoe.

7 Claims, 3 Drawing Figures

WOOD-SPLITTING ATTACHMENT

BACKGROUND OF THE INVENTION

Hydraulically actuated log-splitters have been available for sometime. Such units are expensive and cumbersome since they include a source of power such as an internal combustion engine, a hydraulic system for actuating a wedge to split the wood, all of which must be mounted on a suitable frame strong enough to support these components. One disadvantage of such integral units is that the wood to be split must be placed in position within the unit. Due to the cost of such integral units and the resulting weight, such units are either of limited splitting capacity or are very heavy and expensive.

The present inventive device is comparatively inexpensive and utilizes as a power source an available hydraulic power source of high capacity, namely the hydraulic actuator for rotating the bucket of a backhoe. The bucket is removed from the backhoe and the wood splitting attachment is quickly connected to the dip stick of the backhoe.

SUMMARY OF THE INVENTION

The attachment comprises a main support member for holding a log to be split. A pair of rib members in the form of longitudinal plates strengthen the main support member. The rib members are spaced apart so that the space between them is slightly larger than the width of the dip stick of the backhoe. A pair of upper tabs and a pair of lower tabs extend from both rib members. Each pair of tabs have holes therein which are aligned with existing holes already available in the dip stick. At the lower end of the rounded member a plate is secured to prevent the wood from moving while being split. A wedge is secured to the lower end of the piston otherwise used to actuate the bucket of the buckhoe. A clamp is provided at the upper end of the rounded member to hold the lower end of the actuating cylinder in place.

It is an advantage of the invention that the device may be placed in virtually any position, including horizontal, vertical or otherwise. It may also be placed at various levels, as for example, on the ground or on the top of a flat bed truck.

These and other objects and advantages of the invention will become more apparent as the description proceeds and when considered in conjunction with the drawings.

DESCRIPTION OF THE PREFERED EMBODIMENT

Figure 1:
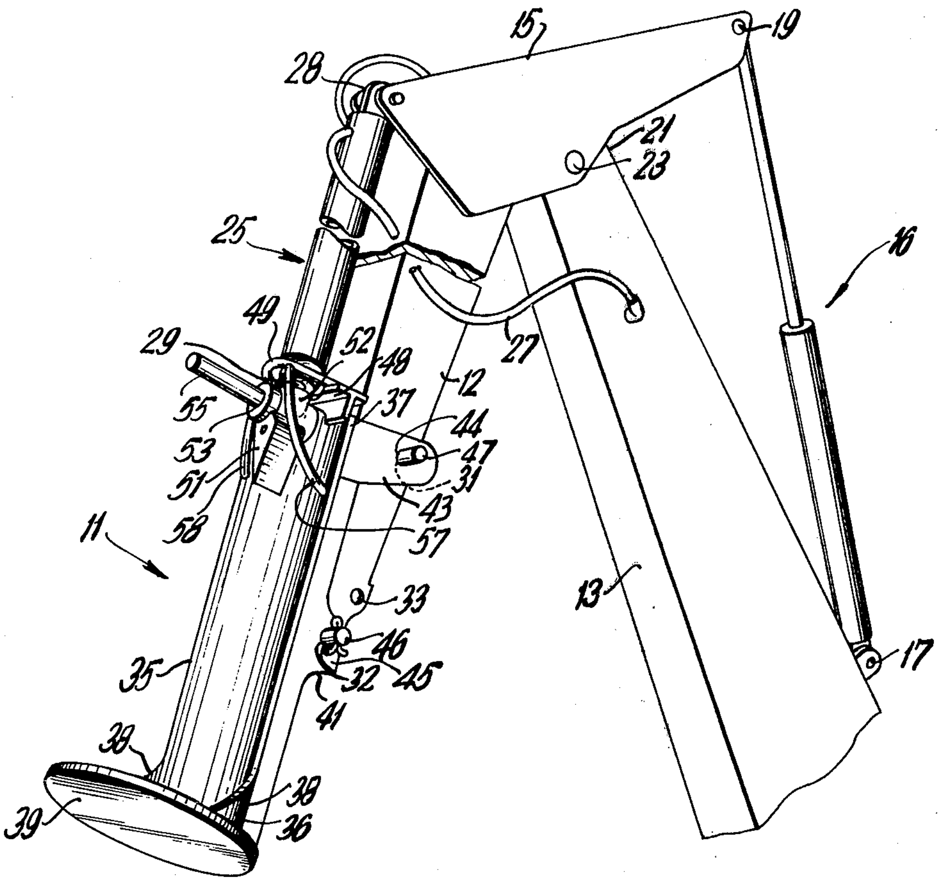
FIG. 1 is a perspective view of the attachment showing the dip stick and the upper end of the boom of a backhoe.

FIG. 1 shows the attachment 11 in place for operation on the dip stick 12 of a commercially available backhoe (not completely shown). The backhoe includes a boom 13 which is normally mounted to pivot in a horizontal plane. An example of such backhoes in general can be found in U.S. Pat. Nos. 3,834,566 and 3,811,582 dated Sept. 10, 1974 and May 21, 1974 respectively. The boom 13 also by means of hydraulic equipment (not shown) may move up and down. The dip stick 12 is pivotably mounted on the end of the boom 13. The boom 13 is rigidly secured to an extension 15. A cylinder and piston assembly 16 is rotatably secured at the lower end 17 to the boom 13 and at the upper end 19 to the outside end of the extension 15. The cylinder and piston assembly 16 pivots the dip stick 12 about the outside end 21 of the boom 13 at a journal 23 in whatever vertical plane the boom is located.

Located along the top surface of the dip stick 12 is a piston and cylinder assembly 25. Hydraulic fluid is supplied to the piston and cylinder assembly 25 by a hydraulic line 27. Controls (not shown) for the piston and cylinder assembly 25 are part of the backhoe to which the wood-splitting attachment 11 is connected. The upper end of the piston and cylinder assembly 25 is rotatably connected to the extension 15. The piston 29 of the piston and cylinder assembly 25 is normally connected to the bucket actuating mechanism (not shown) of the backhoe.

Once the bucket assembly is removed from the dip stick 12, an uppeı opening 31 and a lower opening 32 are available within the dip stick 12. Also, another opening 33 is shown but not used in the preferred embodiment.

The main support member 35 of the attachment 11 is an elongated concave member having a lower end 36 and an upper end 37. The main support member 35 may be fabricated from a piece of large pipe or tubing. At the lower or outside end 36 of the main support member 35, the circumference of the main support member 35 is enlarged to form two corner areas 38. Also at the lower or outside end 36 of the main support member 35 at a right angle to the longitudinal axes of the main support member 35 is a base plate 39 which is preferably round or circular. The base plate 39 which serves as a stop means and is secured rigidly to the main support member 35 preferably by welding.

Longitudinally along the underside of the main support member 35, are a pair of rib members 40. The rib members 40 are secured to the underside of the main support member 35 preferably by welding. The pair of rib members 40 are parallel to one another and are substantially equally spaced from the centerline of the main support member 35 and extend substantially along the entire length of the main support member 35. The spacing between the parallel rib members 40 is slightly larger than the width of the dip stick 12 to permit the rib members 40 to slide snugly over the dip stick 12.

Extending from each of the rib members 40 and in the same plane therewith are middle tabs 41. The middle tabs 41 are located substantially midway between the lower end 36 and the upper end 37 of the main support member 35. Each of the middle tabs 41 are either integral with or are welded to their respective rib member 40. Similarly, upper tabs 43 extend from each rib member 40 near the upper end 37 of the main support member 35. Openings 44 are located in the upper tabs 43 to align with the upper opening 31 in the dip stick 12. The outside end 36 of the main support member 35 extends beyond the outside or lower end 45 of the dip stick 12. A pin 46 through the lower opening 32 and a pin 47 through the upper opening 31 serves rigidly to connect the tabs 41, 43 to the dip stick 12.

At the upper end 37 of the main support member 35 is a retaining assembly which includes a bar 48 rigidly mounted across the inside or upper end 37 of the main support member 35. The bar 48 which is T-shaped spans the edges of the concave main support member 35. A loop 49 is secured to the bar 48. The lower end of the cylinder of the piston and cylinder assembly 25 is pressed into the loop 49 to secure the piston and cylinder assembly 25 in place to assure proper direction to the piston 29 when extended from the piston and cylinder assembly 25.

A hole (not shown) is located in the end of the piston 29 for connection to the bucket actuating assembly (not shown). A wedge 51 for splitting wood has an opening at its upper end 52 into which is placed the end of the piston 29. An opening 53 is located through the wedge 51 at substantially right angles to the piston 29. A pin 55 is placed the opening 53 and the hole in the piston 29 to secure the wedge 51 to the piston 29.

A pair of guide rods 57, 58 extend from the loop 49 to the main support member 35 and are rigidly connected at each end. Upon the return of the wedge 51, the pin 55, unless already in the upright position will strike either guide rod 57 or guide rod 58 and thereby be forced to the upright position. Should the wedge 51 turn at right angles, the split wood would bind between the wedge 51 and the main support member 35.

By rotating the backhoe boom 13 and positioning both the boom 13 and the dip stick 12, the wood splitting attachment 11 can be placed in any position from vertical to horizontal and at various levels. Simple connections to the hydraulic controls of the backhoe permit the operator to stand by the log-splitting attachment 11 and actuate the hydraulic controls of the backhoe. The power necessary in any commercial backhoe device for breaking the earth is of such strength that wood splitting can be readily accomplished at a rapid rate. In addition thereto the log-splitting attachment can be moved on the backhoe which is capable of travel to remote locations. Furthermore, the attachment can be produced of readily available materials at virtually a nominal expense.

Figure 2:
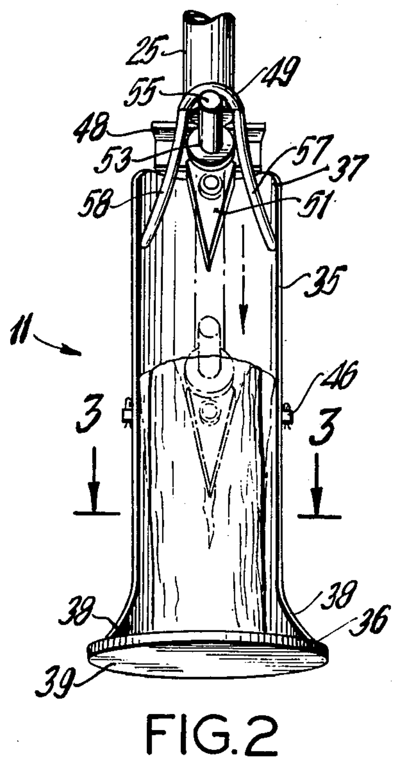
FIG. 2 is a front elevation showing the attachment with a piece of wood in place to be split.
Figure 3:
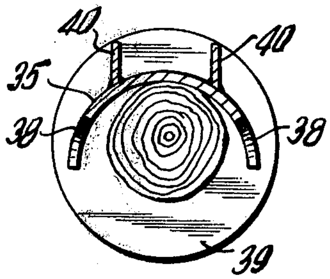
FIG. 3 is a sectional view taken along lines 3—3 of FIG. 2.

A piece of wood, as best shown in FIG. 2, is placed in the attachment 11. The one end of the wood rests against the plate 39. The piston and cylinder assembly 25 is actuated and the wood is split.

While the inventive wood splitting attachment is described with respect to a relatively simple embodiment, it will be apparent to those skilled in the art that numerous variations and modifications may be made within the spirit and scope of the invention as set forth in the appended claims.

I claim:

1. A wood-splitting attachment for removable attachment to the end of the dip stick of a backhoe, said backhoe having a controlled hydraulic system with a piston and cylinder extending along the upper surface of the dip stick, said wood-splitting attachment including:

an elongated concave trough, said elongated concave trough having an inside end and an outside end;

a means for attaching said elongated concave trough, to the dip stick of a backhoe, said elongated concave trough being longitudinally aligned with said dip stick with the outside end of said elongated concave trough extending beyond the outside end of said dip stick;

means for attaching a wedge means to the piston of the piston and cylinder extending along the upper surface of said dip stick;

a stop means rigidly attached to the outside end of said elongated concave trough at substantially right angles to said elongated concave trough; and a clamp means for securing the cylinder of said piston and cylinder along the longitudinal axes of said elongated concave trough.

2. The wood-splitting attachment of claim 1 wherein said means for attaching said elongated concave trough to the dip stick of a backhoe includes a pair of substantially parallel ribs extending longitudinally along the underside of the elongated concave trough.

3. The wood-splitting attachment of claim 2 wherein said pair of parallel ribs includes:

a pair of upper tabs located toward the inside end of said, elongated concave trough, each one of said pair of upper tabs having a hole therein; and a pair of middle tabs located generally midway between the inside end and the outside end of said elongated concave trough each one of said pair of middle tabs having a hole therein.

4. The wood-splitting attachment of claim 3 wherein said means for attaching said elongated concave trough further includes a pair of pins engaging said holes in said upper tabs and said middle tabs.

5. The wood-splitting attachment of claim 1 wherein said clamp means includes a bar rigidly mounted across the inside of the elongated concave trough and a loop rigidly secured to said bar.

6. The wood-splitting attachment of claim 1 wherein said stop means is a circular plate.

7. The wood-splitting attachment of claim 1 wherein:

said means for attaching said elongated concave trough to the dip stick of a backhoe includes a pair of substantially parallel ribs extending longitudinally along the underside of the elongated concave trough each parallel rib including an upper tab located toward the inside end of the elongated concave trough and a middle tab located generally midway between the inside end and the outside end of said elongated concave trough each upper tab and each middle tab having a hole therein, said means for attaching further including a pair of pins for engaging said upper tabs and said middle tabs;

said clamp means includes a bar rigidly mounted across the inside end of the elongated concave trough and a loop rigidly secured to said bar; and said stop means is a circular plate.

* * * * *